United States Patent Office 3,129,129
Patented Apr. 14, 1964

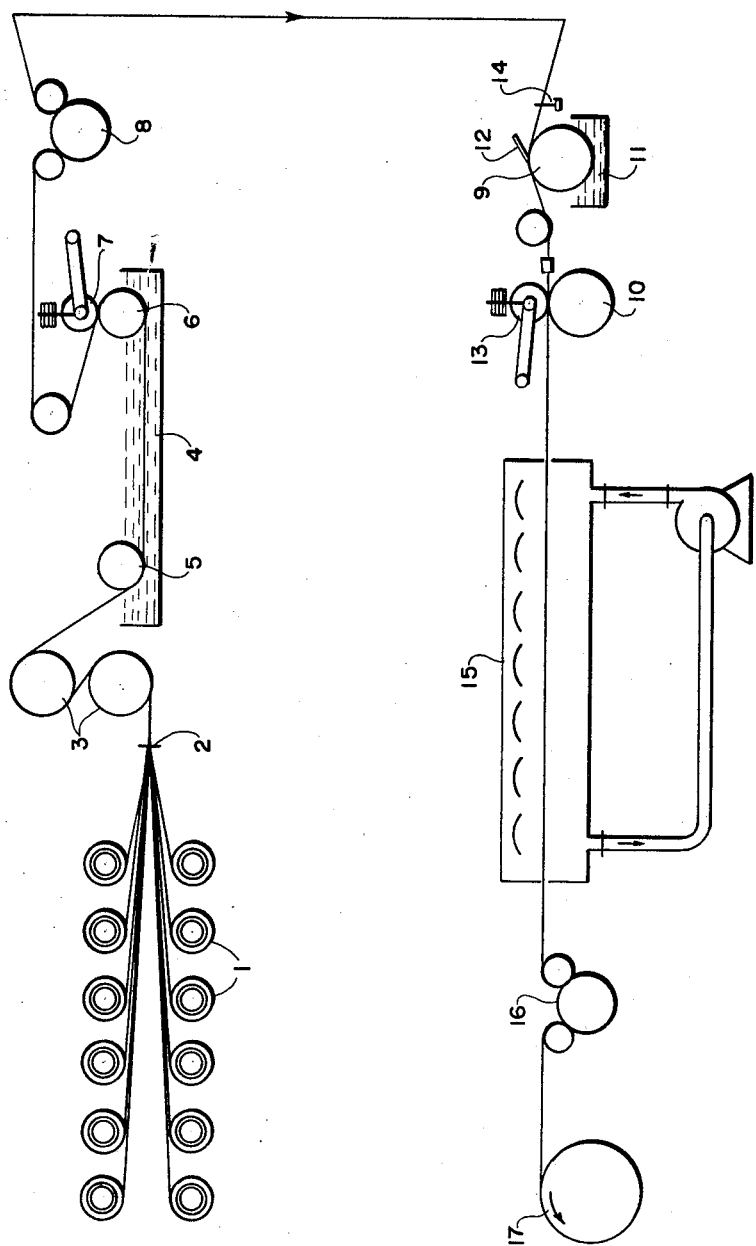

3,129,129
METHOD FOR PREPARING SYNTHETIC TIRE CORD FABRIC
Hans Schrode, Wuppertal-Elberfeld, Heinz Grotjahn, Dremmen, Rhineland, and Kurt Heuer, Oberbruch-Grebben, Germany, assignors to American Enka Corporation, Enka, N.C., a corporation of Delaware
Filed Oct. 17, 1960, Ser. No. 63,059
Claims priority, application Germany Oct. 24, 1959
11 Claims. (Cl. 156—161)

This invention relates generally to a method of preparing a reinforcing fabric, and more particularly to a method of preparing a reinforcing fabric for use as reinforcing inserts in pneumatic tires and the like. Still more particularly, this invention relates to a method of producing tire reinforcing fabric of threads having a basis of synthetic materials such as, for example, rayon and polyesters, characterized by a high elasticity modulus.

Reinforcing inserts for articles made of rubber or synthetic elastomers for use as pneumatic tires and the like consist of cord fabrics which are made from rayon, polyesters or other suitable threads. It is required that such threads have high strengths and low elongations. However, the threads heretofore manufactured generally had too low an elasticity modulus. A high elasticity modulus is, however, necessary so that the movement of the threads in the region of the tire tread is as small as possible, for it is by this means that the wear on the tires is reduced.

According to E. Wagner, "Mechanisch-technologische Textilprüfungen," 7th Edition, 1957, page 105, what is understood by elasticity modulus is "the ratio between the applied tensile stress and the elongation caused thereby within the elasticity limit, represented in the stress-strain diagram by that point where the ascending line moves away from the straight line." Since the elasticity modulus of the threads is constant with stresses and strains which are smaller than those which correspond to this point and an elongation of 1% lies within this range, the elasticity moduli hereinafter referred to have always been determined with an elongation of 1% in order to obtain a good comparison. The value thereof is indicated in kilograms per square millimeter ($kg./mm.^2$).

A further requirement as regards reinforcing inserts of pneumatic tires at the tire tread surface is a certain rigidity, but this has not been very high due to the low elasticity modulus of the corded material heretofore manufactured. An attempt has been made to increase the rigidity by additional inserts, but this procedure was not satisfactory for various reasons. Consequently, an insert material has long been sought which has a high elasticity modulus in addition to the high strength which until now has also been required, so that this material can impart the required increased rigidity to the tires.

It is, accordingly, an important object of this invention to provide a method of preparing an improved tire reinforcing fabric insert for pneumatic tires which will be free from the foregoing and other disadvantages.

Another object of this invention is to provide a method of incorporating continuous threads of synthetic material into a band of elastomer employing novel binding agents whereby a reinforcing material with a high elasticity modulus, eminently suitable for use as inserts for pneumatic tires, is produced.

Other objects of this invention will appear from the following detailed description.

It has been found that narrow rubber bands with a high elasticity modulus, into which bands are incorporated artificial threads which are completely without twist and which have an elasticity modulus of at least 9 $kg./mm.^2$, are suitable as such as insert material, it being necessary that there be a good bond between the artificial threads and the rubber.

By comparison with cord material consisting of twisted threads, such rubber bands with inlaid rayon threads avoid turning and twisting and have per se a higher strength and lower elongation, which values are further increased and lowered respectively in the required sense due to the fact that the threads are stretched in the manufacture of the rubber bands. A hitherto unattainable high elasticity modulus is thus obtained, so that the tires have a higher rigidity than those which are manufactured with cord material.

In the manufacture of such rubber bands, it was necessary to solve the problem of so binding the separated threads, which are disposed in parallel relation and completely free from twist in a continuous operation to the rubber composition that a complete adhesion is achieved. For this purposes it has been found that binding agents of partially condensed polymers of hydroxy benzenes and formaldehyde, or polyisocyanates are suitable. It is, for example, possible to use a partially condensed resorcin-formaldehyde resin. For application to the threads this resin is mixed in an aqueous medium with finely-divided rubber, such as for example natural latex or artificial rubber such as vinyl-pyridine latex, or a mixture of both. The threads are introduced into this mixture and heated, the condensation being carried still further and the adhesion being achieved. These agents are particularly advantageously used for rayon threads, although they may be used with other threads. With polyester threads, better results are obtained by the use, as binding agents, of polyisocyanates, such as, for example, triphenyl methane triisocyanate in a solution in methylene chloride. In this case, the rubber solution must also be anhydrous. A firm adhesion of the threads to the rubber occurs when the rubber coated threads are subjected to heat.

Preferably the threads should be impregnated while they are in an untensioned condition, whereas the subsequent heating step takes place while the rubber coated threads are under tension. In order that the separate filaments of the threads will bond well to the rubber, any twisting of the filaments must be avoided. It is therefore necessary to unwind the threads by allowing them to roll off the spools, bobbins, or other suitable thread packages. If desired, the impregnation can take place in several stages followed by a severe squeezing operation after each stage.

The invention will now be described in connection with the figure of the drawing which diagrammatically shows an apparatus whereby the method of the invention may be carried out.

In the drawing, the reference numeral 1 generally indicates a plurality of supply packages, which may be a spool, bobbin or the like, mounted on a frame or creel which is provided with threaded tension devices or brakes (not shown) normally used thereon. The threads are withdrawn from the supply package through a comb 2 by means of driven rollers 3. The desired spacing of the threads and the width of the band of spaced threads are brought about by the said comb 2.

The threads in parallel form are then drawn through a liquid bath 4 in which they are retained for about 15 to 20 seconds. Idler roller 5 and driven roller 6 are positioned in the bath 4 for guiding the sheet of parallel threads therethrough. On leaving the bath 4, the excess liquid of the bath is removed from the threads. To this end, a spring pressed roller 7 is provided, the spring causing the roller 7 to apply a substantially heavy pressure on roller 6.

From the squeeze roller arrangement of rollers 6 and 7, the sheet of parallel threads are suitably guided to driven rollers 8, 9 and 10. The roller 9 dips into a bath of liquid 11 of the same composition as the liquid of bath 4, and the sheet of parallel threads while in contact with said roller 9 has surface liquid removed therefrom by a stripper 12. A spring-biased idler roller 13 is adapted to cooperate with driven roller 10 to squeeze the threads to remove more liquid therefrom prior to the drying step. A comb 14 is positioned before the second bath 11 to orientate the threads prior to their contact with the liquid on roller 9. From the squeeze roller arrangement of rollers 10 and 13, the sheet of parallel threads is passed through a drying apparatus 15, then onto driven roller 16 and finally wound on take-up device 17.

Since it is required that the sheet of parallel threads pass through liquid bath 4 under an untensioned condition, the speed of driven rollers 3 and 6 are regulated so that this condition obtains. Where tension on the sheet of parallel threads is desired, however, as when the threads are stretched in wet condition and while they are being dried, the tension is effected by driving all of the rollers 9, 10 and 16 at the same speed but at a speed faster than that at which roller 8 is driven, the speeds being so adjusted that an after-stretch tension of up to 1 gram per denier is obtained.

The following examples are given so that this invention may be more clearly understood. These examples are given for illustrative purposes only and are not to be construed as limitative.

EXAMPLE I

Four spools of rayon threads of 1680 denier with individual denier of 1.65 were mounted in an untwisted condition on the frame. The threads had a strength of 540 grams per 100 denier, a breaking elongation of 16% in the conditioned state and an elasticity modulus of 13.1 kg./mm.$^2$. The threads were brought together and conveyed at a withdrawal speed of 2.1 meters per minute over the rollers 3. The threads were thereafter thoroughly impregnated in the bath 4 with the dipping solution, the dipping path or retention time being 60 centimeters.

The dipping solution was prepared as follows:

*Solution A*

|  | Grams |
|---|---|
| Water | 580.8 |
| Resorcin | 21.7 |
| Formaldehyde 38% | 44.8 |
| Sodium hydroxide solution 10% | [1] 7.7 |
|  | 655.0 |

[1] 7.0 cc.

The sodium hydroxide solution is added to the water and the resorcin is dissolved therein, the formaldehyde being the last to be added. This solution is allowed to stand for 16 to 24 hours at 20° C.

*Solution B*

|  | Grams |
|---|---|
| Water | 149.5 |
| Sodium hydroxide solution 10% | [1] 11.5 |
| Natural latex 60% | 184.0 |
|  | 345.0 |

[1] 10.4 cc.

After the said standing period of 16 to 24 hours, the solution A is poured into the solution B. The prepared impregnating solution is then stored for 48 hours before use so that the necessary degree of condensation of the resorcin-formaldehyde resin is reached. This impregnating solution has approximately 15% of dry substance.

In passing through the bath 4 of the impregnating solution with a speed of 2.1 meters per minute of the threads on the rollers 8, the residence time therein was 17 seconds. The trough 11 contained the same solution as 4. The rollers 16 and 10 had a speed of 2.4 meters per minute. The path length in the drier was 12 meters and the drying temperautre 80° C.

Bands with a width of 6 millimeters and a thickness of 0.1 millimeter had a total strength of 530 grams per 100 denier, a breaking elongation of 6.5% and an elasticity modulus of 25.4 kg./mm.$^2$.

EXAMPLE II

Seven spools of rayon threads of 1000 denier and an individual denier of 0.5 were mounted in an untwisted condition on the frame. The threads had a strength of 560 grams per 100 denier, a breaking elongation of 8.5% in the conditioned state and an elasticity modulus of 15.2 kg./mm.$^2$. The threads were brought together and conveyed at a withdrawal speed of 2.1 meters per minute over the rollers 3.

The impregnation of the threads was then carried out over an immersion path length of 60 centimeters with the same dipping solution as in Example I. The speed at the rollers was 2.1 meters per minute. The trough 11 contained the same solution as the trough 4. The bands were drawn off at the roller 16 with a speed of 2.2 meters per minute. The path length in the drier was 12 meters and the air temperature was 80° C.

The bands had a total strength of 560 grams per 100 denier with a breaking elongation of 4.2%. The elasticity modulus was 36.4 kg./mm.$^2$. The width of the bands was 6 millimeters and the thickness 0.1 millimeter.

EXAMPLE III

Twelve spools of rayon threads of 1650 denier with an individual denier of 1.54 were placed in an untwisted condition on the frame. The threads had a strength of 580 grams per 100 denier, a breaking elongation of 13.5% in the conditioned state and an elasticity modulus of 14.1 kg./mm.$^2$. The threads were brought together and conveyed with a withdrawal speed of 2.1 meters per minute over the rollers 3. Thereafter, the impregnation of the threads was effected in the bath 4 with a solution as in Example I and over a dipping path length of 60 centimeters. The speed at the rollers 8 was 2.12 meters per minute. The trough 11 contained the same solution as the bath 4. At the roller 16, the band was drawn off at a speed of 2.3 meters per minute. The path length in the drier was 20 meters and the air temperature was 90° C.

The band has a total strength of 540 grams per 100 denier with a breaking elongation of 5.8%. The elasticity modulus was 31.3 kg./mm.$^2$. The width of the band was 6 millimeters and the thickness 0.35 millimeter.

EXAMPLE IV

Six spools of polyester threads of 1000 denier and an individual denier of 4.2 were placed in an untwisted condition on the frame. They had a strength of 610 grams per 100 denier. The dipping solution consisted of a mixture of 25 parts by weight of a 20% solution of triphenylmethane triisocyanate in methylene chloride with a solution of 100 parts by weight of raw rubber, 15 parts by weight of carbon black, 5 parts by weight of zinc oxide and 2 parts by weight of sulphur, plasticizer, age resister and vulcanization accelerator in 800 parts by weight of benzene. The threads were dipped as set forth above, except that the second treatment with the dipping solution (in trough 11) was dispensed with. The drying temperature was 160°. The resulting band had a strength of 40 kilograms and an elasticity modulus of 40 kg./mm.$^2$.

While preferred modifications of the invention have been shown, it is to be understood that changes and variations may be made herein without departing from the spirit and scope of the invention as defined in the appended claims.

What is claimed is:

1. A method of producing a reinforcing fabric of high elasticity modulus for elastomeric articles, which comprises treating a weftless ribbon of synthetic threads, each thread being substantially completely free from twist, while free from tension, said synthetic threads selected from the group consisting of rayon and polyester threads, with a liquid medium containing rubber and a polymeric material selected from the class consisting of partially polymerized mixtures of hydroxy benzenes and formaldehyde, and polyisocyanates, then stretching and heat-drying the treated threads under tension.

2. A method of producing a reinforcing fabric of high elasticity modulus for elastomeric articles, which comprises treating a weftless ribbon of synthetic threads, each thread being substantially completely free from twist and having an elasticity modulus of at least 9 kilograms per square millimeter, while free from tension, said threads selected from the group consisting of rayon and polyester threads, with a liquid medium containing rubber and a polymeric material selected from the class consisting of partially polymerized mixtures of hydroxy benzenes and formaldehyde, and polyisocyanates, then stretching and heat-drying the treated threads under tension.

3. Method according to claim 2 wherein the liquid medium is a suspension of rubber and the polymeric material contained therein is a partially polymerized mixture of resorcin and formaldehyde.

4. Method according to claim 2 wherein the liquid medium is a solution of rubber to which was added a solution of triphenyl methane triisocyanate in methylene chloride.

5. Method according to claim 2 wherein the liquid medium is prepared by mixing a solution of water, resorcin, formaldehyde and sodium hydroxide with a solution of water, sodium hydroxide and latex.

6. Method of producing reinforcing fabrics having a high elasticity modulus for reinforcing inserts for rubber tires, which comprises passing a weftless ribbon of synthetic threads, each of said threads being substantially completely untwisted and untensioned and having an elasticity modulus of at least 9 kilograms per square millimeter, through a liquid medium containing rubber and a polymeric material selected from the group consisting of partially polymerized mixtures of hydroxy benzene and formaldehyde, and polyisocyanates, removing excess liquid from said ribbon and then stretching and heat-drying the said ribbon under tension.

7. Method according to claim 6 wherein the liquid medium is a suspension of rubber and the polymeric material contained therein is a partially polymerized mixture of resorcin and formaldehyde.

8. Method according to claim 6 wherein the liquid medium is prepared by mixing a solution of water, resorcin, formaldehyde and sodium hydroxide with a solution of water, sodium hydroxide and latex.

9. Method according to claim 7 wherein the ribbon is composed of rayon threads.

10. Method according to claim 6 wherein the liquid medium is a solution of rubber to which was added a solution of triphenyl methane triisocyanate in methylene chloride.

11. Method according to claim 10 wherein the ribbon is composed of polyester threads.

References Cited in the file of this patent

UNITED STATES PATENTS

| | | |
|---|---|---|
| 2,429,397 | Compton et al. | Oct. 31, 1947 |
| 2,441,071 | Jahant | May 4, 1948 |
| 2,497,454 | Illingworth et al. | Feb. 14, 1950 |
| 2,643,207 | Entwistle | June 23, 1953 |
| 2,739,918 | Illingworth | Mar. 27, 1956 |
| 2,862,281 | Klausner | Dec. 2, 1958 |
| 3,042,569 | Paul | July 3, 1962 |
| 3,052,584 | Smith | Sept. 4, 1962 |